(12) United States Patent
Thal (10) Patent No.: US 7,210,219 B2
(45) Date of Patent: May 1, 2007

(54) CIR-CLIP TO SHAFT INSERTION TOOL

(75) Inventor: Paul Thal, Novi, MI (US)

(73) Assignee: Cinetic Automation Corporation, Farmington Hills, MI (US)

( * ) Notice: Subject to any disclaimer, the term of this patent is extended or adjusted under 35 U.S.C. 154(b) by 609 days.

(21) Appl. No.: 10/233,076

(22) Filed: Aug. 30, 2002

(65) Prior Publication Data

US 2004/0040138 A1 Mar. 4, 2004

(51) Int. Cl.
*B23P 21/00* (2006.01)

(52) U.S. Cl. .............................. 29/709; 29/714; 29/719; 29/229; 29/281.1; 29/283; 29/284; 901/35; 901/36; 901/40; 901/46

(58) Field of Classification Search ............. 29/407.05, 29/407.09, 407.1, 709, 712, 714, 719, 743, 29/744, 222, 225, 229, 243.56, 252, 269, 29/271, 281.1, 281.5, 283, 284; 269/8, 21; 901/31, 35, 36, 39, 40, 46
See application file for complete search history.

(56) References Cited

U.S. PATENT DOCUMENTS

| | | | |
|---|---|---|---|
| 2,456,355 A * | 12/1948 | Aber | 411/360 |
| 2,858,947 A * | 11/1958 | Chapman, Jr. | 414/5 |
| 3,936,926 A | 2/1976 | Hornschuch | |
| 3,951,271 A * | 4/1976 | Mette | 414/591 |
| 3,988,821 A * | 11/1976 | Daniels et al. | 29/283 |
| 3,999,277 A | 12/1976 | Hamada | |
| 4,265,388 A | 5/1981 | Takahashi et al. | |
| 4,293,995 A | 10/1981 | Jordan | |
| RE30,802 E | 11/1981 | Rogers, Jr. | |
| 4,320,568 A | 3/1982 | Herrod et al. | |
| 4,339,866 A | 7/1982 | Horton et al. | |
| 4,402,122 A * | 9/1983 | Hawkins et al. | 29/243.56 |
| 4,550,485 A * | 11/1985 | Killian | 29/450 |
| 4,592,122 A * | 6/1986 | Sikula | 29/229 |
| 4,597,365 A | 7/1986 | Madaffer | |
| 4,644,912 A | 2/1987 | Umeha et al. | |
| 4,660,269 A | 4/1987 | Suzuki | |
| 4,667,399 A * | 5/1987 | Berliner | 29/809 |
| 4,708,029 A | 11/1987 | Urano | |
| 4,732,310 A | 3/1988 | Umeha et al. | |
| 4,738,012 A | 4/1988 | Hughes et al. | |
| 4,761,870 A | 8/1988 | Urano | |
| 4,781,075 A | 11/1988 | Yamaji et al. | |
| 4,783,898 A | 11/1988 | Kanamaru et al. | |
| 4,809,562 A | 3/1989 | Bendoraitas et al. | |

(Continued)

FOREIGN PATENT DOCUMENTS

JP 63016933 A * 1/1988
JP 06277959 A * 10/1994

*Primary Examiner*—Jermie E. Cozart
(74) *Attorney, Agent, or Firm*—Harness, Dickey & Pierce, P.L.C.

(57) ABSTRACT

The fastener to shaft insertion tool is disclosed which consists of a shaft holding member, a fastener insertion member, and force transmitting member. The fastener holding member facilitates the holding of the fastener and the application of forces to the fastener necessary for its proper insertion onto a shaft. Forces are provided to the fastener holding member by way of a hydraulic or pneumatic actuator. The fasteners are inserted adjacent a ring or gear being coupled to the shaft.

34 Claims, 5 Drawing Sheets

U.S. PATENT DOCUMENTS

| | | |
|---|---|---|
| 4,827,585 A | 5/1989 | Nakamura |
| 4,847,963 A | 7/1989 | Bendoraitas et al. |
| 4,858,295 A | 8/1989 | Hartnett et al. |
| 4,875,270 A | 10/1989 | Krips et al. |
| 4,913,617 A * | 4/1990 | Nicholson .................. 414/729 |
| 4,915,574 A * | 4/1990 | Park et al. .................. 414/680 |
| 4,922,785 A | 5/1990 | Arnold et al. |
| 4,924,584 A | 5/1990 | Harney |
| 4,969,262 A | 11/1990 | Hiraoka et al. |
| 4,993,282 A | 2/1991 | Swars |
| 5,007,165 A | 4/1991 | Podhorsky |
| 5,065,507 A | 11/1991 | Wakamori et al. |
| 5,077,877 A * | 1/1992 | Piotrowski .................. 29/229 |
| RE33,868 E | 4/1992 | Maus et al. |
| RE33,888 E | 4/1992 | Hartnett et al. |
| 5,108,140 A * | 4/1992 | Bartholet .................. 294/106 |
| 5,189,785 A * | 3/1993 | Toyota Jidosha Kabushiki Kaisha et al. .................. 29/809 |
| 5,195,239 A | 3/1993 | Breuer et al. |
| 5,197,188 A | 3/1993 | Maus et al. |
| 5,220,727 A | 6/1993 | Hochstein |
| 5,259,268 A | 11/1993 | Ebbinghaus et al. |
| 5,272,930 A | 12/1993 | Nakamura et al. |
| 5,280,675 A | 1/1994 | Orsini, Jr. |
| 5,280,981 A * | 1/1994 | Schulz .................. 294/106 |
| 5,287,615 A | 2/1994 | Swars |
| 5,337,476 A | 8/1994 | Orsini, Jr. |
| 5,378,033 A * | 1/1995 | Guo et al. .................. 294/116 |
| 5,428,894 A | 7/1995 | Orsini, Jr. |
| 5,435,207 A | 7/1995 | Orsini, Jr. |
| 5,437,097 A | 8/1995 | Yanagawa |
| 5,588,204 A * | 12/1996 | Rossman .................. 29/809 |
| 5,664,463 A | 9/1997 | Amborn et al. |
| 5,713,611 A | 2/1998 | Kurimoto et al. |
| 5,729,899 A | 3/1998 | Kaywood et al. |
| 5,868,042 A | 2/1999 | Swars |
| 5,881,452 A * | 3/1999 | Nowell et al. .................. 29/816 |
| 5,938,099 A * | 8/1999 | Ciccarelli .................. 227/19 |
| 6,035,515 A | 3/2000 | Baer et al. |
| 6,182,361 B1 | 2/2001 | Cox et al. |
| 6,212,746 B1 * | 4/2001 | Cooks, Jr. .................. 29/243.56 |
| 6,244,644 B1 * | 6/2001 | Lovchik et al. .................. 294/111 |
| 6,314,643 B1 | 11/2001 | Leith |

* cited by examiner

CIR-CLIP TO SHAFT INSERTION TOOL

FIELD OF THE INVENTION

This invention pertains to a mechanism for coupling annularly arranged members about a shaft, and more particularly for use as a mechanism to couple gears to a shaft using cir-clips.

BACKGROUND OF THE INVENTION

Many automotive applications such as gear boxes and axle shafts require the coupling of rings or gears to a shaft. Typically, monolithic tubes or shafts have a plurality of spaced apart cylindrical portions journally mounted onto the shaft. These spaced apart portions are typically coupled to the shaft utilizing methods such as interference fits, welding, and brazing. While these long known methods provide a stable mechanism for the component manufacture, each of these methods have a large potential for off axis deformation of the shaft during the formation process.

Additional methods for coupling rings to shafts include inserting coupling pins into the cylindrical portions or immediately adjacent to the cylindrical portions to couple the cylindrical portions. Inserting the coupling pins through the ring may adversely affect the surface of the cylindrical portion as well as the possibility of loosening over time. As such, it is an object of the present invention to overcome the disadvantages associated with prior systems for annularly coupling members to a shaft.

SUMMARY OF THE INVENTION

In accordance with the present invention, a coupling tool includes a shaft holding force backup member, an insertion member, and a force transmitting member. A further aspect of the present invention employs a fastener holding member to facilitate the holding of a fastener for the application of forces to the fastener necessary for its proper insertion onto a shaft. In accordance with another aspect of the present invention, the fastener holding member has a fastener holding mechanism, which can take the form of magnets or suction orifices. In accordance with another aspect of the present invention, the fastener holding member further defines a slot, which functions to align the fastener with respect to the shaft. One side of the slot is used to apply forces to the cir-clip to facilitate the joining of the two. The cir-clip holding member translates perpendicular to the shaft to facilitate the joining of the components.

In another aspect of the present invention, incorporated into the mechanism is an equalizing "V" type backup. The backup is used to hold the shaft in the proper orientation with the cir-clip holder. Mounted between the backup and the fastener cir-clip holder is a sensor, which measures the distance therebetween.

Another aspect of the present invention as shown in the second embodiment of the invention utilizes an actuator which is positioned approximately parallel to the shaft to apply forces. A finger is disposed within the insertion tool and is used to apply the force to the cir-clip. By using an actuator which actuates through a programmed signature as opposed to perpendicular to the shaft, the cir-clip can be inserted into more confined spaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figures 1A, 1B, 2:
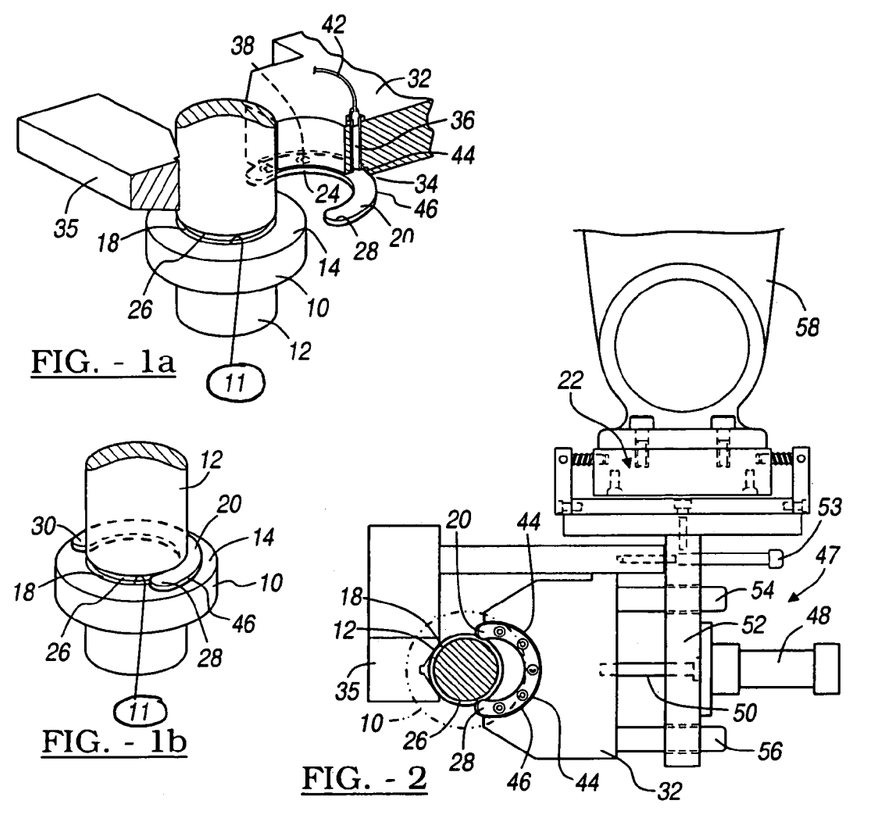
FIGS. 1a and 1b represent perspective cross sectional views of a preferred first embodiment of the present invention.
FIG. 2 represents a top elevational view of the cir-clip insertion mechanism according to the first embodiment of present invention.

FIGS. 1a and 1b exhibit disposition and coupling of a ring or gear 10 about a shaft 12. Ring 10 is annularly disposed about shaft 12, so that a ring first surface 14 is positioned co-planar to a groove 18 formed on shaft 12. Ring 10 is axially coupled to shaft 12 by means of a locking cir-clip 20. Radial rotation of ring 10 about shaft 12 can be regulated by key/slot configurations within the inner diameter 11 of ring 10.

The cir-clip 20, which is a metal stamped C-shaped semi-circular fastener, is inserted into groove 18 by insertion system 22. The cir-clip is used to axially fasten a ring 10 onto a shaft 12. Cir-clip 20 has a first surface 24 that is positioned so as to contact the bottom 26 of groove 18. Additionally, cir-clip 20 has a surface 27 that is placed in contact with first surface 14 of ring 10 to axially limit the movement of ring 10 along shaft 12. The ends 28 and 30 of the cir-clip 20 are radially displaced, while cir-clip 20 is being inserted into groove 18 of shaft 12. Elastic deformation of cir-clip 20 allows cir-clip 20 to expand and close about the diameter of shaft 12 in groove 18.

As seen in FIGS. 1a and 1b, insertion system 22 includes a drive head 32 and a backup 35. Drive head 32 functions to hold cir-clip 20 within an annular depression 34. Annular depression 34 has at least one coupling mechanism 36 to releasably couple cir-clip 20 to drive head 32, while drive head 32 is inserting cir-clip 20.

The coupling mechanism 36 can take the form of magnets 38 disposed on a coupling surface 40 of annular depression 34. Further, coupling mechanism 36 can take the form of a pneumatic system 42, which uses a vacuum to couple cir-clip 20 within annular depression 34. It is envisioned that any mechanism which releasably couples cir-clip 20 to drive head 32 but which does not interfere with insertion of dr-clip 20 into the shaft 12 is acceptable.

Annular depression 34 is defined by a forcing surface 44, which mates with a driven surface 46 of cir-clip 20. A relatively constant force is applied through forcing surface 44 by a forcing mechanism 47. Forcing mechanism 47 is comprised of a controllable fluid actuator which can be either a hydraulic pneumatic actuator or electromechanical actuator 48, which applies pressure to drive head 32, through member 50. Drive head 32 is linearly moved toward groove 18 in a direction generally perpendicular to shaft 12.

Drive head 32 is coupled to a pair of linear shafts 54 and 56. Linear shafts 54 and 56 allow drive head 32 to apply linear insertion forces to the cir-clip 20 without applying axial forces to shaft 12 which may cause distortion of shaft 12. Additionally coupled to base 52 is backup 35, which radially holds shaft 12 in place and transmits equalizing counterforces into shaft 12 to allow insertion of cir-clip 20 into groove 18.

Disposed between drive head 32 and base 52 is a sensor 53, which functions to measure the movement of drive head 32. Measurements from sensor 53 are used to determine when the assembly operation is complete.

Figure 3:
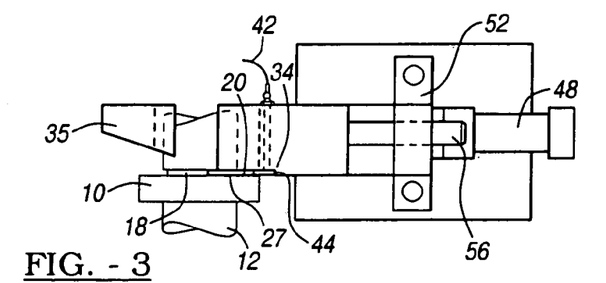
FIG. 3 represents a side elevational view of the mechanism depicted in FIG. 2.

FIG. 3 depicts the insertion system 22 for inserting cir-clips 20 onto shaft 12 according to the teachings of the first embodiment of the present invention. System 22 is shown in a position immediately prior to actuation of the forcing mechanism 47. Coupling mechanism 38 has been actuated to hold cir-clip 20 into annular depression 34. Additionally shown is the mounting frame 56 which couples the system 22 to a robotic arm 58, which is a part of an industrial articulator or gantry robot.

Robotic arm 58 allows the system 22 to be brought into place in the correct position once the ring 10 has been disposed about shaft 12. Further, robotic arm 58 allows the insertion system 22 to be moved away from the shaft to allow disposition of a second ring (not shown) onto shaft 12. Robotic arm 58 then indexes the insertion system 22 along shaft 12 to allow insertion of the second cir-clip 20 adjacent the second ring.

Figure 4A:
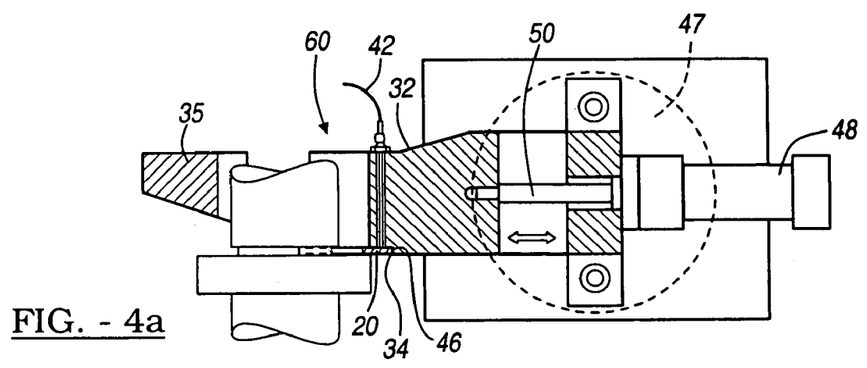
FIGS. 4a–4c represent the insertion of a cir-clip onto a shaft as depicted in the side cross sectional views of the first embodiment according to the present invention.
Figure 4B:
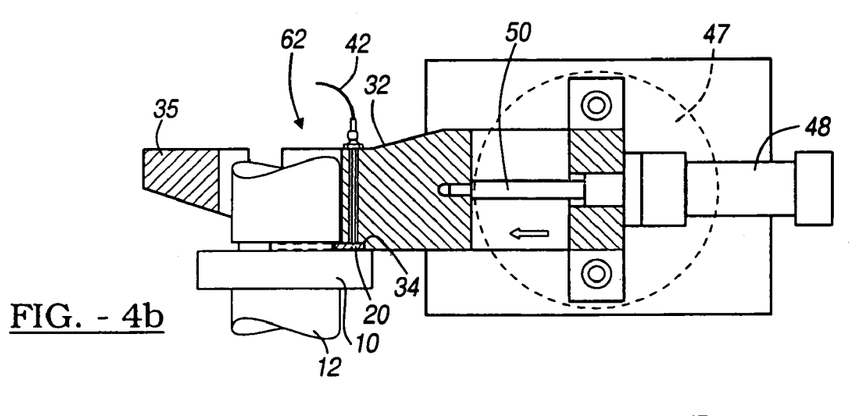
Figure 4C:
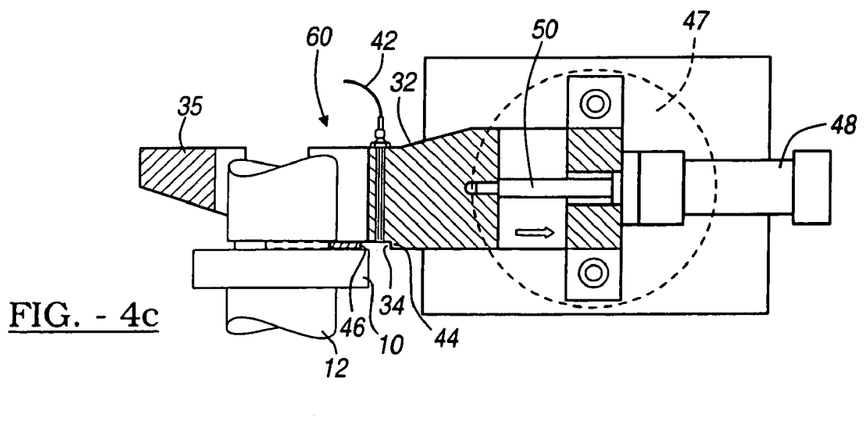

FIGS. 4a–4c represent actuated in the insertion of the cir-clip 20 onto the shaft 12. As is best seen in FIG. 4a, the actuator 48 applies forces to drive head 32. Forces from drive head 32 are applied to cir-clip 20 via forcing surface 44 of annular depression 34.

FIG. 4b shows actuator 48 applying forces to drive head 32. Disposed between backup 35 and drive head 32 is shaft 12 to which ring 10 is being coupled. Drive head 32 has been moved from its unengaged positioned 60 to its engaged positioned 62. Disposed between drive head 32 and top surface 64 of ring 10 is cir-clip 20. The bottom surface of drive head 32 is configured not to interfere with top surface 64 of ring 10 when drive head 32 is in its engaged positioned 62. Cir-clip 20 slides along top surface 64 of ring 10 while being inserted. Top surface 64 and coupling surface 40 of annular depression 34, trap cir-clip 20 and prevents it from being axially displaced while cir-clip 20 is being inserted into groove 18.

FIG. 4c shows insertion system 22 being displaced from its engaged position 62 to its unengaged position 60. After cir-clip 20 has been inserted into groove 18 of shaft 12, the coupling mechanism 36 releases the cir-clip 20 from drive head 32. This allows drive head 32 to be retracted from shaft 12 by actuator 48.

Figures 5A, 5B, 6:
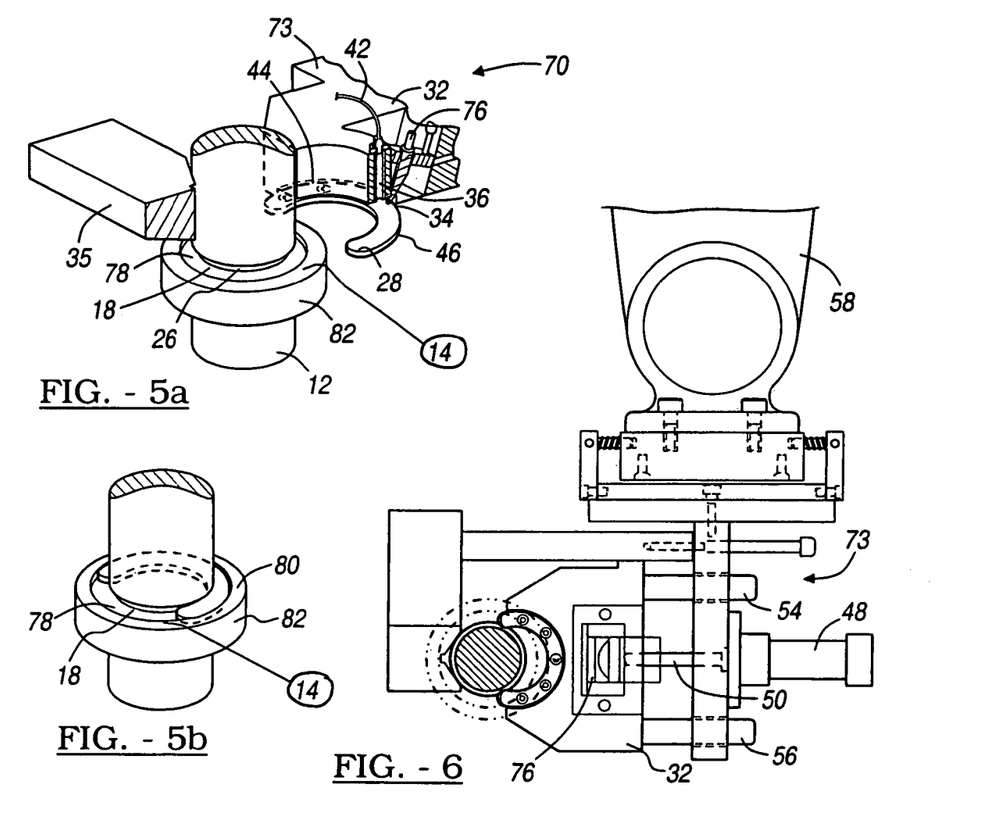
FIGS. 5a and 5b depict the disposition and coupling of a ring about the shaft using an alternate embodiment of the present invention.
FIG. 6 depicts a top elevational view of the cir-clip insertion mechanism according to the alternate embodiment of the present invention.

FIGS. 5a and 5b exhibit the disposition and coupling of a ring 82 about shaft 12 using an alternate embodiment of the present invention. The ring 82 is annularly disposed about shaft 12 so that first surface 14 of ring 82 is positioned either coplanar to groove 18 (as seen in FIG. 5a) or off planar (as seen in FIG. 5b). Ring 82 is coupled to shaft 12 by means of locking cir-clip 20.

The cir-clip 20 is inserted into groove 18 by insertion system 70. Cir-clip 20 has a first surface 24 that is positioned so as to contact the bottom 26 of groove 18. Additionally, cir-clip 20 has a surface 27 that is placed in contact with first surface 14 of ring 82. The ends 28 and 30 of cir-clip are radially displaced while cir-clip 20 is being inserted into groove 18 of shaft 12.

As seen in FIG. 5a, insertion system 70 includes drive head 32 and backup 35. Drive head 32 functions to hold cir-clip 20 within the annular depression 34. Annular depression 34 has at least one coupling mechanism 36 to releasably couple cir-clip 20 to drive head 32. Further incorporated into drive head 32 is secondary actuator 72, which is configured to apply additional vertical and horizontal forces to cir-clip 20.

As with the system depicted in FIGS. 1a, and 1b, coupling mechanism 36 can take the form of magnets 38 disposed on a coupling surface 40 of annular depression 34. Further, coupling mechanism 36 take the form of a pneumatic system 42, which uses a vacuum to couple cir-clip 20 within annular depression 34.

The annular depression 34 is defined by forcing surface 44, which mates with driven surface 46 of cir-clip 20. Force is applied through forcing surface 44 by first forcing mechanism 73. The first forcing mechanism 73 is comprised of the controllable hydraulic, pneumatic actuator or electromechanical 48, which applies pressure to drive head 32, through member 50. Drive head 32 is linearly moved toward groove 18 in a direction generally perpendicular to shaft 12.

The secondary actuator 72 is configured to apply additional forces to cir-clip 20. The secondary actuator 72 is formed of a secondary force applying member 74, which is coupled to a second pneumatic or electromechanical member 76. The additional forces are used to force cir-clip 20 into an annular slot 78 disposed within upper surface 80 of ring 82, as shown in FIG. 5b. Annular slot 78 allows additional rings or gears (not shown) to be disposed upon ring 82 without having a space between the rings.

Drive head 32 is coupled to a pair of linear shafts 54 and 56. Linear shafts 54 and 56 allow drive head 32 to apply linear insertion forces to cir-clip 20 without applying forces to cir-clip 20 which may cause cir-clip 20 to be dislodged from drive head 32. Additionally coupled to base 52 is backup 35, which radially holds shaft 12 in place and transmits counterforces into shaft 12 to allow insertion of cir-clip 20 into groove 18.

Figure 7:
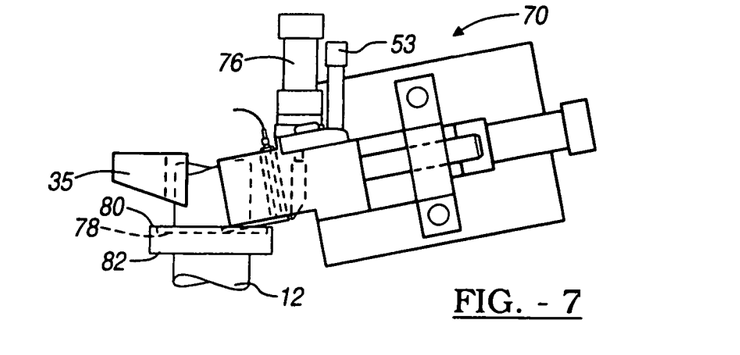
FIG. 7 depicts a side elevational view of the cir-clip insertion device as shown in FIG. 2.

FIGS. 6 and 7 depict insertion system 70 for inserting cir-clips 20 onto a shaft 12 according to the teachings of the second embodiment of the present invention. Insertion system 70 shown in a position immediately prior to actuation of the first forcing mechanism 73. Coupling mechanism 38 has been actuated to hold cir-clip 20 into annular depression 34. Additionally shown is the mounting frame 56 which couples insertion system 70 to robotic arm 58. Robotic arm 58 can be used to rotate the insertion mechanism about an axis perpendicular to axis of shaft 12 to apply forces to cir-clip 20 in a non-perpendicular fashion. This allows the system to insert cir-clip 20 into annular slot 78 disposed within upper surface 80 of ring 82. As with robotic arm 58 depicted in the first embodiment, robotic arm 58 additionally allows insertion system 70 to be brought into place in the correct position once ring 82 has been disposed about shaft 12.

Figure 8A:
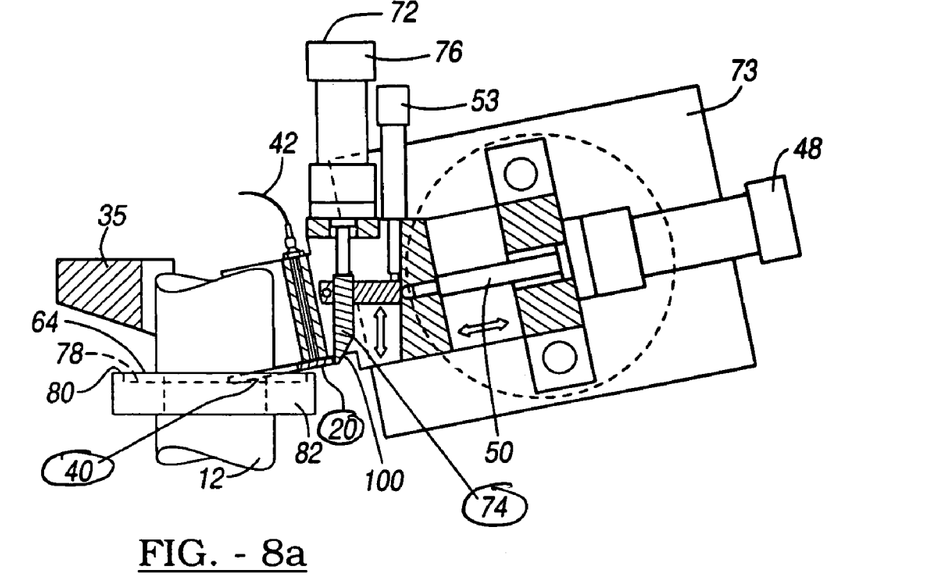
FIGS. 8a–8d represent a side elevational view showing the insertion of a cir-clip utilizing the alternate embodiment of the present invention.

FIGS. 8a–8d represent actuation stages of the insertion of cir-clip 20 onto shaft 12. As is best seen in FIG. 8a, actuator 48 applies forces to drive head 32. Forces from drive head 32 are applied to cir-clip 20 via forcing surface 44 of annular depression 34.

Figure 8B:
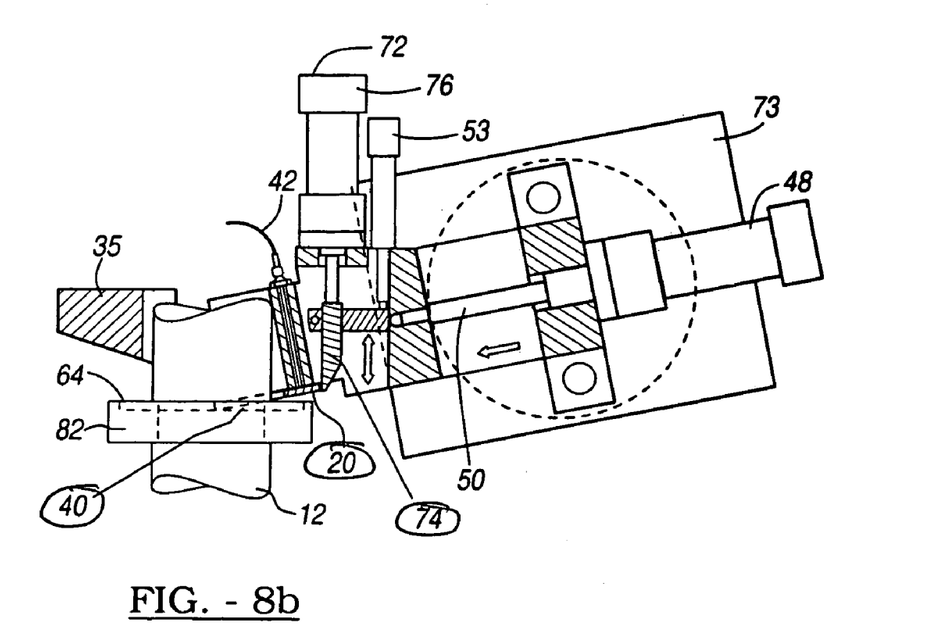

FIG. 8b shows actuator 48 applying forces to drive head 32. Disposed between backup 35 and drive head 32 is shaft 12 to which ring 82 is being coupled. Drive head 32 has been moved from its unengaged positioned 60 to its engaged positioned 62. Disposed between drive head 32 and top surface 64 of ring 82 is cir-clip 20. The bottom surface of drive head 32 is configured not to interfere with top surface 64 of ring 82 when drive head 32 is in its engaged positioned 62. Cir-clip 20 slides along top surface 64 of ring 82 while being inserted. Top surface 64 and coupling surface 40 of the annular depression 34, trap cir-clip 20 and prevent it from being axially displaced while cir-clip 20 is being inserted into groove 18.

Figure 8C:
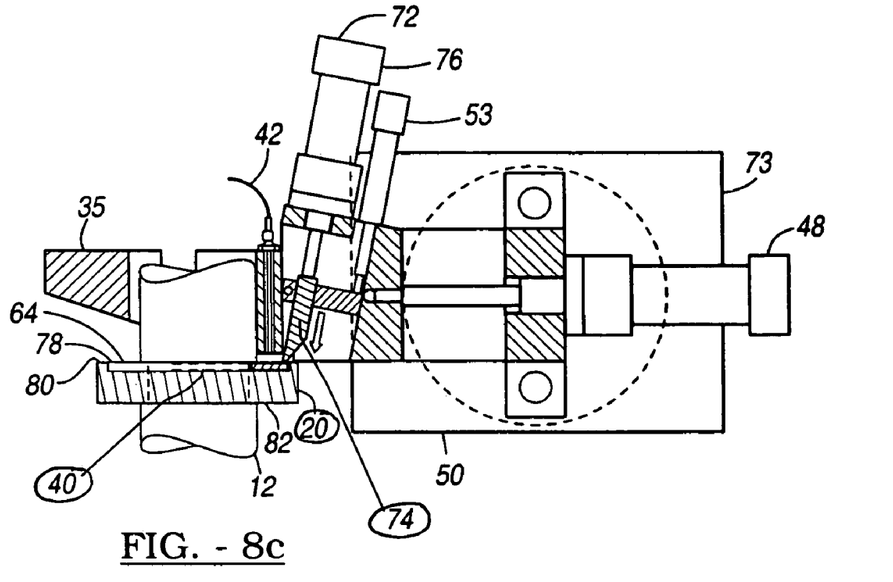

FIG. 8c shows the actuation of secondary actuator 72. Secondary actuator 72 is shown applying vertical and horizontal force to cir-clip 20. Coupled to secondary actuator 72 is a sensor 53, which functions to measure the movement of secondary actuator 72. Measurements from sensor 53 are transmitted to a controller (not shown) which regulates the radial position of the robot arm 58 using feed-back control methodologies. By regulating the angle of insertion from insertion system 70 utilizing robotic arm 58 as well as vertical forces, the insertion system 70 can position cir-clip 20 into slots heretofore not previously possible. The shape of the mechanism 72, 76 in conjunction with tool/tip 100 prevents the cir-clip from popping out during insertion.

Figure 8D:
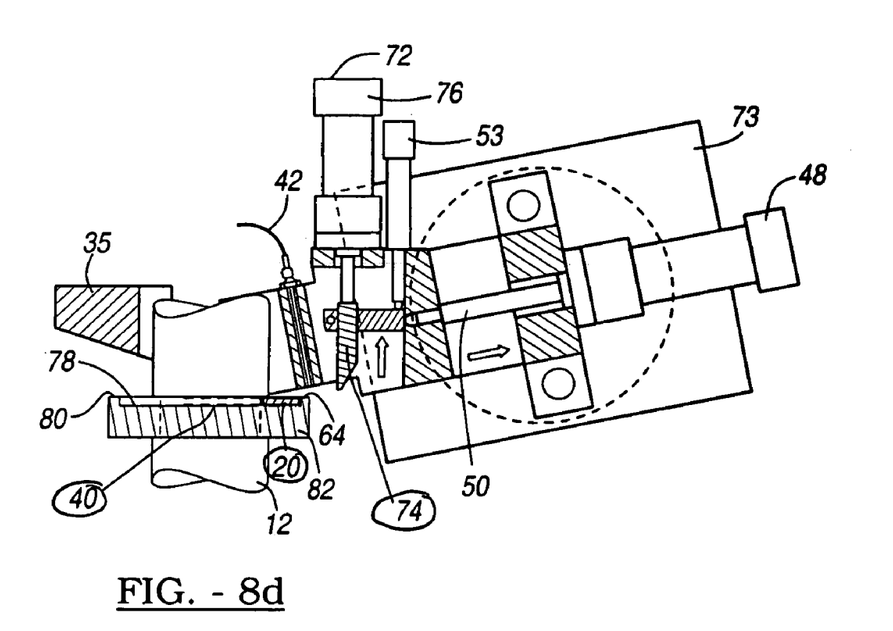

FIG. 8d shows insertion system 70 being displaced from its engaged position 62 to its unengaged position 60. After cir-clip 20 has been inserted into grooves 18 of shaft 12, coupling mechanism 36 releases cir-clip 20 from drive head 32. This allows drive head 32 to be retracted from shaft 12 by actuator 47.

The description of the invention is merely exemplary in nature and, thus, variations that do not depart from the spirit of the invention are intended to be within the scope of the invention. For example, the mechanism can be adapted to insert deformable straight pins or fasteners adjacent the rings being coupled to the shaft. Additionally, the robotic arm can be programmed to move in complicated trajectories to facilitate the insertion of the fastener onto the shaft in close tolerance situations. Such variations are not to be regarded as a departure from the spirit and scope of the invention.

What is claimed is:

1. A mechanism for coupling a wheel comprising a circular depression to a shaft, the mechanism comprising:
   a shaft holding member;
   a drive head coupled to the shaft holding member configured to hold a cir-clip;
   an actuator coupled to the drive head configured to apply equalizing forces to the cir-clip to couple the cir-clip to the shaft; and
   a sensor coupled to the drive head, the sensor operably transmitting a signal indicative of the location of the drive head;
   wherein the drive head defines an annular depression, configured to hold the cir-clip.

2. The mechanism according to claim 1 wherein the annular depression comprises a cir-clip holding mechanism.

3. The mechanism according to claim 2 wherein the cir-clip holding mechanism is a magnet.

4. The mechanism according to claim 1 wherein the drive head comprises a cir-clip holding mechanism which is configured to releasably hold the cir-clip during insertion onto the shaft.

5. The mechanism according to claim 1 wherein the actuator is an air powered actuator.

6. The mechanism according to claim 1 wherein the actuator is configured to translate the drive head perpendicular to the shaft.

7. A mechanism for coupling a cir-clip to a shaft, the mechanism comprising:
   a shaft holding member;
   a drive head coupled to the shaft holding member comprising an annular depression configured to hold the cir-clip, the annular depression operably employing a vacuum to releasably hold the cir-clip; and
   an actuator coupled to the drive head configured to apply equalizing forces to the cir-clip to couple the cir-clip to the shaft.

8. The mechanism according to claim 7 wherein the drive head comprises a cir-clip holding mechanism which is configured to releasably hold the cir-clip during insertion onto the shaft.

9. The mechanism according to claim 7 further comprising a sensor coupled to the drive head, the sensor operably transmitting a signal indicative of the position of the drive head.

10. The mechanism according to claim 7 wherein the drive head defines an annular depression, configured to hold the cir-clip.

11. A mechanism for coupling an annular member with an annular depression onto a shaft, the mechanism comprising:
    a drive head configured to releasably hold a substantially semi-circular fastener;
    a first actuator configured to move the drive head generally perpendicular to the shaft so as to cause the substantially semi-circular fastener to be inserted onto the shaft substantially perpendicular to a longitudinal axis of the shaft;
    a second actuator configured to apply force to the substantially semi-circular fastener in a direction offset from that applied by the first actuator to cause the substantially semi-circular fastener to be fastened to the shaft; and
    a sensor coupled to the head, the sensor operably transmitting a signal indicative of the position of the head.

12. The mechanism according to claim 11 wherein the drive head comprises an annular depression configured to hold the substantially semi-circular fastener.

13. The mechanism according to claim 12 wherein the depression defines a force transmitting surface configured to apply forces from the first actuator to the substantially semi-circular fastener.

14. The mechanism according to claim 11 wherein the drive head is positioned adjacent the annular member so as to position the substantially semi-circular fastener adjacent annular member, the annular member being a gear.

15. The mechanism according to claim 11, wherein the annular member has a first surface, and wherein the drive head is positioned so as to place the substantially semi-circular fastener in contact with the first surface.

16. The mechanism according to claim 15 wherein the substantially semi-circular fastener is disposed between the first surface and the drive head.

17. The mechanism according to claim 11 wherein the first actuator comprises an air driven piston.

18. A mechanism for coupling an annular member with an annular depression onto a shaft, the mechanism comprising:
- a drive head configured to releasably hold a substantially semi-circular fastener;
- a first actuator configured to move the drive head generally perpendicular to the shaft so as to cause the substantially semi-circular fastener to be inserted onto the shaft substantially perpendicular to a longitudinal axis of the shaft;
- a second actuator configured to apply force in a direction offset from that applied by the first actuator to the substantially semi-circular fastener; and
- a robotic arm coupled to the drive head;
- wherein the drive head comprises an annular depression configured to hold the substantially semi-circular fastener.

19. The mechanism according to claim 18 further comprising a sensor coupled to the head, the sensor operably transmitting a signal indicative of the position of the head.

20. A system comprising:
- a substantially semi-circular fastener;
- an elongated member having an elongated axis;
- a drive head operable to releasably hold said fastener;
- said drive head moving in a first and non-perpendicular direction relative to said axis of said member during installation of said fastener to said member;
- said drive head operably moving in a second and substantially perpendicular direction relative to said axis of said member during completion of the installation of said substantially semi-circular fastener to said member; and
- a robotic arm coupled to said drive head.

21. The system according to claim 20, wherein said substantially semi-circular fastener is a cir-clip fastener.

22. A system comprising:
- a substantially semi-circular fastener;
- an elongated member having an elongated axis;
- a drive head operable to releasably hold said fastener;
- said drive head moving in a first and non-perpendicular direction relative to said axis of said member during installation of said fastener to said member;
- said drive head operably moving in a second and substantially perpendicular direction relative to said axis of said member during completion of the installation of said substantially semi-circular fastener to said member; and
- a backup configured to equalize reaction forces to said member.

23. The system according to claim 22, wherein said substantially semi-circular fastener is a cir-clip fastener.

24. A system comprising:
- a substantially semi-circular fastener;
- an elongated member having an elongated axis;
- a drive head operable to releasably hold said fastener;
- said drive head moving in a first and non-perpendicular direction relative to said axis of said member during installation of said fastener to said member;
- said drive head operably moving in a second and substantially perpendicular direction relative to said axis of said member during completion of the installation of said substantially semi-circular fastener to said member; and
- fastening a gear onto said member.

25. The system according to claim 24, wherein said gear fastened to said member by said fastener is a part of a motor vehicle.

26. The system according to claim 25, wherein said part is in a transmission.

27. The mechanism according to claim 24 further comprising a robotic arm coupled to said drive head.

28. The system according to claim 24, wherein said substantially semi-circular fastener is a cir-clip fastener.

29. A mechanism for coupling an annular member onto a shaft wherein the annular member comprises an annular slot, the mechanism comprising:
- a shaft holding member;
- a drive head configured to releasably hold a substantially semi-circular fastener;
- a first actuator configured to move the drive head generally perpendicular to the shaft so as to cause the substantially semi-circular fastener to be inserted onto the shaft substantially perpendicular to a longitudinal axis of the shaft;
- a second actuator configured to apply at least one of a horizontal or a vertical force directly to the substantially semi-circular fastener to couple the annular member onto the shaft; and
- a robotic arm coupled to the drive head.

30. The mechanism according to claim 29 wherein the drive head comprises an annular depression configured to hold the semi-circular fastener.

31. The mechanism according to claim 29 wherein the annular member has a first surface, and wherein the drive head is positioned so as to place the substantially semi-circular fastener in contact with the first surface.

32. The mechanism according to claim 31 wherein the substantially semi-circular fastener is disposed between the first surface and the drive head.

33. The mechanism according to claim 29 wherein the first actuator comprises an air driven piston.

34. A mechanism for coupling an annular member onto a shaft wherein the annular member comprises an annular slot, the mechanism comprising:
- a shaft holding member:
- a drive head configured to releasably hold a substantially semi-circular fastener;
- a first actuator configured to move the drive head generally perpendicular to the shaft so as to cause the substantially semi-circular fastener to be inserted onto the shaft substantially perpendicular to a longitudinal axis of the shaft;
- a second actuator configured to apply at least one of a horizontal or a vertical force directly to the substantially semi-circular fastener to couple the annular member onto the shaft; and
- a sensor coupled to the head, the sensor operably transmitting a signal indicative of the position of the head.

* * * * *

UNITED STATES PATENT AND TRADEMARK OFFICE
CERTIFICATE OF CORRECTION

PATENT NO. : 7,210,219 B2 Page 1 of 1
APPLICATION NO. : 10/233076
DATED : May 1, 2007
INVENTOR(S) : Paul Thal It is certified that error appears in the above-identified patent and that said Letters Patent is hereby corrected as shown below:

Column 2, line 14, after "of", insert --the--.

Column 3, line 4, "dr-clip" should be --cir-clip--.

Column 3, line 44, after "represent", delete "actuated in".

Column 3, line 52, "positioned" should be --position--.

Column 3, line 53, "positioned" should be --position--.

Column 3, line 56, "positioned" should be --position--.

Column 4, line 34, after "electromechanical", insert --actuator--.

Column 4, line 57, after "70", insert --is--.

Column 5, line 11, "positioned" should be --position--.

Column 5, line 12, "positioned" should be --position--.

Column 5, line 15, "positioned" should be --position--.

Column 6, line 59, Claim 14, after "adjacent", insert --the--.

Column 8, line 8, Claim 26, "said" should be --the--.

Column 8, line 41, Claim 33, after "wherein", "the" should be --said--.

Signed and Sealed this

Nineteenth Day of May, 2009

JOHN DOLL
*Acting Director of the United States Patent and Trademark Office*